April 13, 1965 H. T. WINCHEL 3,178,619

DETECTOR CIRCUIT

Filed Feb. 23, 1960

INVENTOR:
Henry T. Winchel
By Smyth & Roston
Attorneys.

United States Patent Office 3,178,619

Patented Apr. 13, 1965

3,178,619
DETECTOR CIRCUIT

Henry T. Winchel, Los Angeles, Calif., assignor to Consolidated Electronics Industries Corp., New York, N.Y., a corporation of Delaware Filed Feb. 23, 1960, Ser. No. 10,307
10 Claims. (Cl. 317—148.5)

Figure 1:
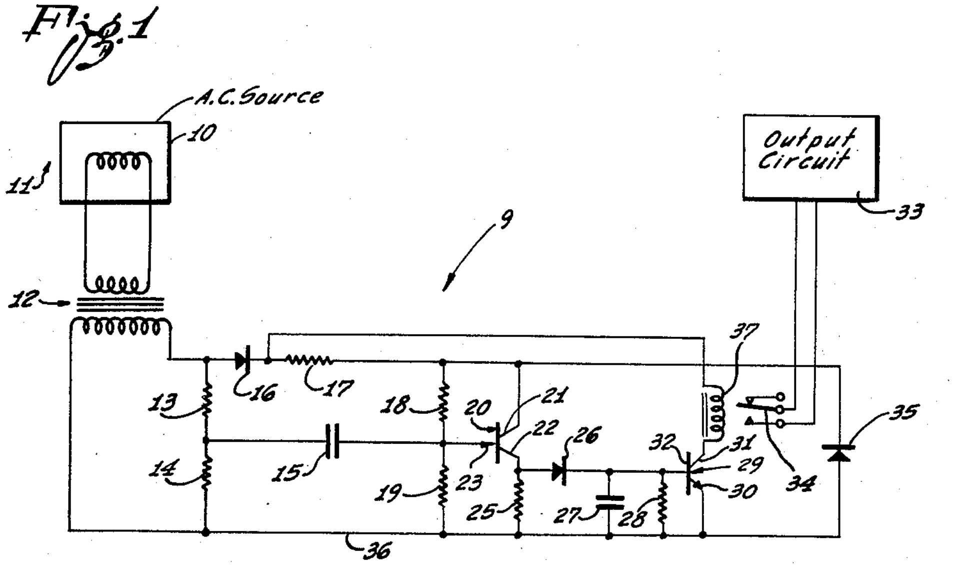

This invention relates to a detector and more particularly to electronic circuitry for detecting changes in the magnitude of an alternating current signal.

There are many applications in which it is desirable to monitor the magnitude of current provided through a line. In some applications, the accuracy of electrical circuit operations depends upon the magnitude of the line current. In other applications, such as power supply applications, monitoring the line current and providing an indication when it exceeds a predetermined value is necessary.

In a specific illustrative embodiment of this invention, a detector circuit is provided which operates a relay to provide an indication of the detection of a peak current in excess of a predetermined magnitude. Though the relay need not be of a highly sensitive type, the circuit is highly sensitive and accurately detects a small variation of the peak amplitude of an alternating line current. The detector circuit includes transistor means in the form of a uni-junction transistor which has a normally high impedance condition and an operative low impedance condition. The alternating line current is utilized to develop an alternating potential across a voltage divider arrangement having a junction which is capacitively coupled to the transistor means.

The signal across the voltage divider is also rectified and filtered and applied as a constant biasing potential under control of a Zener diode to the transistor means. The biasing potential in itself is insufficient to operate the transistor means and change its impedance condition. The unregulated alternating current signal, however, as indicated above, is coupled from the junction of the voltage divider to the transistor means. If the peak-to-peak alternating line current increases above a predetermined magnitude, the transistor means becomes briefly forward-biased and operates to assume its low impedance condition.

When the transistor means become operative, it charges a capacitive storage element which controls a transistor switch. When the storage element is charged by the transistor means, it operates the transistor switch and an output relay serially connected with the switch. The uni-junction transistor returns to its normal condition as the current decreases from its peak value. When the transistor means returns to its normal condition, the sequence of operations is repeated as long as the peak-to-peak value of alternating line current exceeds the predetermined magnitude. As long as the input alternating current exceeds the predetermined value, the output relay remains operated, and the transistor means is oscillated back and forth between its two impedance conditions.

Features of this invention relate to the utilization of a rectified component of the input current for biasing the transistor means and an alternating component for operating it. The detector circuit actually includes two voltage dividers, one for receiving a regulated potential for biasing the transistor means and the other for developing an alternating current signal for controlling the operation of the transistor means.

Figure 2:
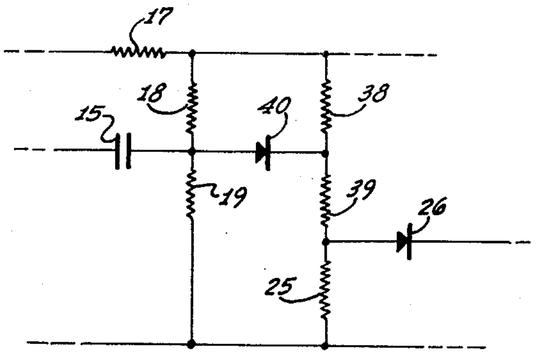

Further advantages and features of this invention will become apparent upon consideration of the following description when read in conjunction with the drawings wherein:

FIGURE 1 is a circuit representation of the detector circuit of this invention; and FIGURE 2 is a functional representation of some of the components in the detector circuit of this invention.

Referring to FIGURE 1, an alternating current source 10 provides an input signal which is monitored by the detector circuit generally designated at 9. The source 10 may include a current transformer which is magnetically coupled to a line 11. The output of the current transformer is a signal directly proportional to the current through the line 11. The alternating current signal developed by the line current is coupled through a transformer 12 across a voltage divider consisting of a resistor 13 and a resistor 14. The resistors 13 and 14 may have suitable values such as 18 kilohms and 10 kilohms, respectively. The two resistors 13 and 14 are shunted across the secondary of the transformer 12 with one terminal of the resistor 14 being connected to a common circuit connection 36. The upper terminal of the resistor 13 is connected to a diode 16 which functions as a rectifier providing a pulsating direct current signal at its cathode. The diode 16 may be of the type designated 1N461 manufactured by the Hughes Aircraft Company. The cathode of the diode 16 is connected by a resistor 17 to a Zener diode 35. The resistor 17 may have a resistance illustratively of 680 ohms and the Zener diode 35 may have a Zener voltage of 25 volts.

The Zener diode 35 is a circuit element which provides a predetermined potential across its terminals as long as the potential applied thereto is greater than the predetermined potential. The predetermined potential illustratively may be 25 volts. The potential, therefore, at the junction of the resistor 17 and Zener diode 35 is coupled volts as long as the alternating current potential across the secondary of the transformer 12 exceeds 25 volts. The junction of the resistor 17 and Zener diode 35 is coupled to a second voltage divider consisting of two resistors 18 and 19. The resistors 18 and 19 are connected between the junction of the resistor 17 and the Zener diode 35 to the common connection 36. The resistor 18 may have a suitable value such as 100 kilohms and the resistor 19 may have a suitable value such as 200 kilohms so that a signal having a magnitude of two-thirds the potential across the Zener diode 35 appears at the junction of the resistors 18 and 19. With the potential across the diode 35 at 25 volts, the potential at the junction of the resistors 18 and 19 is at 16.67 volts.

The resistor 17 functions somewhat as a filter for the Zener diode 35 with the potential across it varying with the potential across the secondary of the transformer 12. The potential at the junction of the voltage divider consisting of the resistors 18 and 19 biases a transistor means 20 which may be a uni-junction transistor. A uni-junction transistor is a three terminal transistor of the type, for example, manufactured by the General Electric Company and designated by the numbers 28490 to 28494 with the different numbers in this range indicating different particular characteristics.

The three terminals of the uni-junction transistor 20 are designated respectively as the base 21, the base 22 and the emitter 23. The emitter 23 is connected to the junction of the resistors 18 and 19 forming a voltage divider for the regulated biasing potential applied to the uni-junction transistor 20. The base 21 is connected to the junction of the resistor 17 and the Zener diode 35, and the base 22 is connected by a resistor 25 to common connection 36. The resistor 25 may have a suitable value such as 500 ohms.

The uni-junction transistor 20 is normally substantially nonconductive having an impedance between the emitter 23 and the base 22 which is quite high such as in the order of several million ohms. The impedance between the bases 21 and 22 is also normally high such as in the order of 10 kilohms. The impedance between the emitter 23 and the bases 21 and 22 of the transistor 20 are respectively illustrated schematically at 38 and 39 in FIGURE 2.

In FIGURE 2, the diode 40 represents the rectifying operation of the emitter junction. The diode 40 is reverse-biased for potentials less than 30 volts peak-to-peak across the secondary of the transformer 12. The rectified biasing potential at the junction of the resistors 18 and 19 reverse-biases the diode 40 due to the fact that the impedance 39 is very large. The potential at the junction of the resistors 38 and 39 at the cathode of the diode 40 is slightly less than 25 volts when the voltage across the Zener diode is 25 volts. Illustratively the potential at the cathode of the diode 40 may be 24 volts. As described above, the biasing potential at the anode of the diode 40 is 16.67 volts when the potential across the diode 35 is 25 volts. The diode 40 is accordingly reverse-biased by 24 minus 16.67 volts or 7.33 volts due to the rectified current through the diode 16.

When the peak-to-peak voltage across the secondary of the transformer 12 exceeds 30 volts, an alternating current component is coupled through a capacitor 15 to the emitter 23 which is sufficient at the positive peak to forward bias the diode 40. The capacitor 15, which has a suitable value such as 10 microfarads is coupled between the junction of the resistors 13 and 14 forming the first voltage divider and the junction of the resistors 18 and 19 forming the second voltage divider. For the illustrative values of the resistors 13 and 14 mentioned above (18 kilohms and 10 kilohms) the voltage swing at the junction of the resistors 13 and 14 is $^{10}\!/_{28}$ of the voltage swing across the secondary of the transformer 12. When a potential of thirty volts appears across the secondary of the transformer 12, the potential across the resistor 14 is approximately 10.7 volts.

The A.C. ripple is accordingly coupled through the capacitor 15 to the emitter electrode 23 of the transistor 20. As described above, the transistor 20 is reverse-biased by the regulated potential across the Zener diode 35. When the potential across the secondary winding of the transformer 12 exceeds a predetermined value illustratively at 30 volts, the transistor 20 becomes forward-biased.

Ignoring for the moment the filtering effect of the resistor 17, the sequence for operating the transistor 20 is a step-by-step sequence as the input potential increases. During the time the instantaneous potential across the secondary of the transformer 12 is increasing from 0 to 25 volts in a direction such that the anode of the diode 16 is becoming more positive, the Zener diode 35 is effectively an open circuit device. The full potential across the secondary winding of the transformer 12 appears across the Zener diode 35. The full potential also appears across both voltage dividers. The alternating current potential through the capacitor 15 is insufficient to overcome the reverse-biasing potential applied by the second voltage divider consisting of the resistors 18 and 19 to the emitter 23 of the transistor 20. The transistor 20 accordingly remains in its high impedance condition.

When the potential introduced to the Zener diode exceeds 25 volts, the potential across the Zener diode is effectively locked at 25 volts with a further increase of input potential not increasing the potential across the diode 35. The reverse-biasing potential applied to the transistor 20 does not therefore further increase with the input potential. The potential coupled through the capacitor 15 however does increase with further instantaneous increases of the input potential. At a predetermined instantaneous potential across the secondary of the transformer 12, the potential through the capacitor 15 is sufficient to overcome the reverse-biasing potential and to operate the transistor 20. The operating sequence of the transistor 20 is initiated in two steps: first the Zener diode 35 is operated to hold the biasing potentials; and then the reverse-biasing potential at the emitter 23 is overcome.

The transistor 20 remains operated only as long as the instantaneous potential across the secondary winding of the transformer 12 exceeds the predetermined operating value. The input signal illustratively varies sinusoidally at a frequency of 60 cycles per second. When the peak-to-peak potential exceeds the predetermined value, the transistor operates at the positive peak. As is hereinafter described, the operating duration of the transistor 20 depends in part on the peak-to-peak voltage across the secondary of the transformer 12. The greater the peak-to-peak voltage, the longer the operating interval.

As described above, the uni-junction transistor 20 becomes forward biased and assumes its operative low impedance condition when the instantaneous predetermined operating potential across the secondary of the transformer 12 is exceeded. When the transistor 20 assumes the low impedance condition becoming conductive, current is provided through the resistor 25 to develop a pulse across the resistor 25. The resistor 25 is coupled by a diode 26 to a storage capacitor 27. The diode 26 may be of the type 1N247 manufactured by the Hughes Aircraft Company, and the capacitor 27 may have a suitable value such as 1 microfarad. The pulse developed across the resistor 25 accordingly positively charges the capacitor 27.

The transistor 20 conducts momentarily during the peak portion of the alternating current signal with the capacitor 15 discharging through the transistor 20 and the resistor 25 and to the capacitor 27. When the capacitor 15 is sufficiently discharged, the transistor 20 returns to its normal high impedance condition and the potential at its base 22 decreases to reverse bias the diode 26.

The potential across the capacitor 27, however, functions to forward bias an NPN junction transistor 29. The base electrode 32 of transistor 29 is connected to the capacitor 27 and also to a resistor 28. The resistor 28, which may have a suitable value such as 10 kilohms, is connected between the base electrode 32 and the common connection 36. The emitter electrode 30 of the transistor 29 is connected directly to the common connection 36, and the collector electrode 31 is connected to one terminal of the winding of an output relay 37. The relay 37 may be of conventional type having impedance of approximately 10 kilohms to direct currents. The other terminal of the winding of the relay 32 is connected to the junction of the diode 16 and the resistor 17, both described above. The capacitor 27 discharges through the resistor 28, which is relatively large, and through the transistor 30. When the capacitor 27 discharges rapidly through the transistor 29, it functions to decrease the potential at the cathode of the diode 26 so that the capacitor 15 may rapidly complete its discharge to turn off the transistor 20. The transistor in this manner oscillates as long as the input signal exceeds the predetermined value becoming operative once during each cycle of the input signal.

The potential applied to the winding 37 through the diode 16 is a pulsating direct current which is normally insufficient for energizing the winding 37 or operating the transistor 29. The transistor 29 functions as a switch in series with the winding 37 with the switch normally being opened so as to prevent current flow through the winding 37. When the capacitor 27, however, is charged through the transistor 20 and the diode 26, the potential at the base electrode 32 increases to forward bias the base-to-emitter junction of the transistor 29 causing it to become conductive. With the transistor 29 in its conductive condition, sufficient current flows through the winding 37 to provide for the operation of the relay. The winding 37 is magnetically coupled to a movable switch or armature 34. When the winding 37 is energized, the armature 34 moves to contact a stationary contact to provide for an output indication to an indicator or output circuit 33. The indication is provided to the output circuit 33 as long as the peak-to-peak voltage across the secondary of the transformer 12 exceeds the predetermined value. The storage capacitor 27 maintains the transistor 29 and the relay operated between pulses from the transistor 20. If the discharge time of the capacitor 27 is small, the transistor 29 can oscillate with the transistor 20. If the relay is fast operating and releasing the output indication can be in the form of a series of pulses.

With the indication in the form of a series of pulses, both an indication that the input signal has exceeded the threshold predetermined value is provided and also an indication of the magnitude of the input signal is provided. The magnitude is indicated by the duration of the pulses provided to the output circuit 33. As described above, the operating duration of the transistor 20 depends partially upon the magnitude of the input signal so that the operating duration of the transistor 29 and the relay are indicative of the input signal magnitude.

Although this invention han been disclosed and illustrated to particular apparatus, the principles involved are accessive to numerous other applications which will be apparent to a person skilled in the art. The invention is to be limited only as indicated by the scope of the following claims.

I claim:

1. A threshold circuit, including, means for providing an alternating signal,
   transistor means having a normal high impedance condition and an operative low impedance condition,
   means coupled to said transistor means and to the alternating signal means for rectifying the alternating signal,
   means responsive to the rectified signal for regulating the rectified signal at a particular peak value regardless of changes in the alternating signal tending to produce rectified signals above the particular peak value,
   means responsive to the rectified signals having the particular peak value for biasing said transistor means with the rectified signal having the particular peak value to maintain the transistor means in the high impedance condition,
   means coupled to said transistor means for applying a particular portion of the alternating signal to said transistor means for overcoming the biasing rectified signal when the peak value of the alternating signal exceeds a particular value whereby said transistor means is operated to its low impedance condition, and
   storage means coupled to said transistor means and responsive to the operation of said transistor means to the low impedance condition for providing an output indication between the successive peaks of the alternating signal which exceed the particular value.

2. A detector circuit, including a source of alternating signals,
   a voltage divider connected to said source in a particular relationship to obtain the production of a particular portion of the alternating potential,
   biasing means including a Zener diode coupled to said source for developing across the voltage divider a direct biasing potential having a regulated value,
   transistor means coupled to said biasing means and having a normally high impedance condition and an operative low impedance condition under control of the direct biasing potential developed by said biasing means, and
   a capacitive coupling between said voltage divider and said transistor means for introducing to said transistor means an alternating signal having a polarity in a direction to overcome the biasing potential from said biasing means and having an amplitude dependent upon the voltage dividing action of the voltage divider whereby said transistor means is operated to its low impedance condition in response to alternating current signals from said source exceeding a particular value.

3. A detector circuit, including a source of alternating potential,
   a voltage divider connected to said source for dividing the alternating potential from said source in a particular relationship to obtain the production of a particular portion of the alternating potential,
   means including a Zener diode coupled to said source for developing a direct biasing potential having a regulated value,
   transistor means coupled electrically to said biasing means and having a normally high impedance condition and an operative low impedance condition under control of the biasing potential developed by said biasing means,
   a capacitive coupling between said voltage divider and said transistor means for introducing the particular portion of the alternating potential to said transistor means from the voltage divider with a polarity in a direction to overcome the direct biasing potential from said biasing means whereby said transistor means is operated to its low impedance condition in response to the particular portion of the alternating potential exceeding a particular value,
   an output member for providing an output indication when the particular portion of the alternating potential from said source exceeds the particular value, and
   a storage member responsive to said transistor means and connected to the output member for operating said output member and for maintaining said output member operative as long as the particular portion of the alternating potential from said source exceeds the predetermined value.

4. A detector circuit, including, a source of alternating current,
   transistor means normally having a high impedance condition and operative to a low impedance condition,
   a rectifying circuit arrangement coupled to the source and to the transistor means for providing a constant direct biasing potential to said transistor means to bias the transistor means against operation in the low impedance condition, and
   circuit means coupled to the source and to the transistor means for providing to said transistor means an alternating signal having an amplitude dependent upon the potential from the source for overcoming the bias potential to operate said transistor means in the low impedance condition when the peak-to-peak voltage of the alternating signal introduced to the transistor means exceeds a particular value.

5. A detector circuit, including, a source of alternating potential,
   transistor means normally having a high impedance condition and operative to a low impedance condition,
   a rectifying circuit arrangement coupled electrically to the source and to the transistor means for providing a constant direct biasing potential to said transistor means,
   circuit means coupled electrically to the source and to the transistor for introducing an alternating signal to said transistor means for operating said transistor means to the low impedance condition when the peak-to-peak voltage of the alternating potential from the source exceeds a particular value,
   capacitive storage means operatively coupled to said transistor means for developing and maintaining an operating potential between successive operations of said transistor means to the low impedance condition and in accordance with the peak-to-peak voltage of the alternating signal introduced to the transistor means,
   an output member, and switching means connected to said output member and to said capacitive storage means for operating said output member when the peak-to-peak voltage of the alternating signal introduced to the transistor means exceeds the particular value.

6. A threshold circuit, including, a source of alternating current signals, a uni-junction transistor having a normal high impedance condition and an operative low impedance condition, said transistor having an emitter, a first base and a second base, means responsive to the alternating signal from the source for rectifying the alternating signal and connected to the uni-junction transistor for biasing said emitter and said first base of said transistor with the rectified voltage in a direction to maintain said transistor in its high impedance condition, said biasing means including means for regulating the rectified biasing potentials to maintain such potentials at a constant value, and means coupled to said emitter of said transistor and to said source for applying the alternating signal from the source to said emitter of said transistor whereby during one half cycle of the alternating current signal the signal tends to counteract the biasing effect of said biasing potential and to operate said transistor when the amplitude of the alternating signal exceeds a particular value.

7. A threshold circuit, including, a source of alternating signals, a uni-junction transistor having a normal high impedance condition and an operative low impedance condition, said transistor having an emitter, a first base and a second base, means responsive to the alternating signal from the source for rectifying the alternating signal and coupled to the uni-junction transistor for biasing said emitter and said first base of said transistor in a direction to maintain said transistor in its high impedance condition, said rectifying and biasing means including means for regulating the direct biasing potential to maintain such potential at a constant value, means coupled to said emitter of said transistor and to said source for applying the alternating signal from said source to said emitter of said transistor whereby during one half cycle of the alternating signal the signal tends to counteract the biasing effect of said biasing potential and to operate said transistor when the amplitude of the alternating signal exceeds a particular value, capacitive storage means coupled to said second base of said transistor for storing a particular charge when the transistor is operated to its low impedance condition, and an output member coupled to said capacitive storage means for providing an output indication when the particular charge is stored by the capacitive storage means and for maintaining the output indication as long as the alternating signals continue to exceed the predetermined value.

8. A threshold circuit, including, a source of alternating signals, a uni-junction transistor having a normal high impedance condition and an operative low impedance condition, said transistor having an emitter, a first base and a second base, means responsive to the alternating signal from the source for rectifying the alternating signal and coupled to the uni-junction transistor for biasing said emitter and said first base of said transistor in a direction to maintain said transistor in its high impedance condition, said rectifying and biasing means including means for regulating the direct biasing potential to maintain such potential at a constant value, means coupled to said emitter of said transistor for applying the alternating signal to said emitter whereby during one half cycle of the alternating current signal the signal tends to counteract the biasing effect of said biasing potential and to operate said transistor when the amplitude of the alternating signal exceeds a particular value, and means coupled to said second base of said transistor and responsive to the operation of said transistor for providing both an indication that the alternating signal has exceeded the particular value and for also providing an indication of the amplitude of the alternating signal.

9. A threshold circuit, including, a source of alternating signals, a uni-junction transistor having a normal high impedance condition and an operative low impedance condition, the transistor having an emitter, a first base and a second base, means operatively coupled to the source and responsive to the alternating signal from the source for rectifying the alternating signal, means including a pair of resistors connected between the first and second bases of the transistor and having a common connection at the emitter of the transistor for introducing the rectified voltage to the transistor to bias the transistor to the high impedance condition, means including a Zener diode connected between the first and second bases of the transistor for regulating the biasing potential introduced to the transistor to maintain the biasing potential constant regardless of changes in the amplitude of the alternating signal, operating means coupled to the emitter of the transistor for applying the alternating signal from the source to the emitter to obtain an operation of the transistor in the low impedance condition for alternating signals above a particular amplitude, and means including an output member responsive to the operation of the transistor in the low impedance condition for providing an operation of the output member.

10. The combination set forth in claim 9 in which the coupling to the emitter of the transistor for introducing the alternating signal from the source to the emitter is provided with a capacitive reactance and in which the operating means also include a resistor connected to the second base of the transistor.

References Cited by the Examiner

UNITED STATES PATENTS

| | | | |
|---|---|---|---|
| 2,866,106 | 12/58 | Schuh | 317—148.5 X |
| 2,875,382 | 2/59 | Sandin et al. | 317—51 X |
| 2,908,829 | 10/59 | Schaeve | 317—148.5 X |
| 2,942,123 | 6/60 | Schuh | 317—148.5 X |

FOREIGN PATENTS

| | | |
|---|---|---|
| 1,217,202 | 12/59 | France. |

SAMUEL BERNSTEIN, *Primary Examiner.*

WALTER L. CARLSON, *Examiner.*